United States Patent
Barfuss et al.

(10) Patent No.: US 9,701,232 B2
(45) Date of Patent: Jul. 11, 2017

(54) OCCUPANCY SENSING WITH HEATING DEVICES

(71) Applicant: GENTHERM CANADA LTD., Windsor (CA)

(72) Inventors: Jack Barfuss, Windsor (CA); Grzegorz Kawa, Windsor (CA); Syed Rafat Iqbal, LaSalle (CA)

(73) Assignee: Gentherm GmbH, Odelzhausen (DE)

( * ) Notice: Subject to any disclaimer, the term of this patent is extended or adjusted under 35 U.S.C. 154(b) by 252 days.

(21) Appl. No.: 14/509,744

(22) Filed: Oct. 8, 2014

(65) Prior Publication Data

US 2015/0102024 A1 Apr. 16, 2015

Related U.S. Application Data (60) Provisional application No. 61/889,557, filed on Oct. 11, 2013.

(51) Int. Cl.
| | | |
|---|---|---|
| *B60L 1/02* | (2006.01) | |
| *B60N 2/56* | (2006.01) | |
| *B62D 1/04* | (2006.01) | |
| *B62D 1/06* | (2006.01) | |
| *B60N 2/00* | (2006.01) | |
| *B60R 21/015* | (2006.01) | |

(52) U.S. Cl.
CPC .......... *B60N 2/5685* (2013.01); *B60N 2/002* (2013.01); *B60R 21/01532* (2014.10); *B62D 1/046* (2013.01); *B62D 1/065* (2013.01)

(58) Field of Classification Search
CPC .......... B62D 1/06; B62D 1/046; B62D 1/065; B60N 2/5685; B60N 2/002; B60R 21/01532; B60R 21/0153; B60R 21/01512; B60R 21/01516; B60R 21/01524; B60R 21/01554
See application file for complete search history.

(56) References Cited

U.S. PATENT DOCUMENTS

| | | |
|---|---|---|
| 3,740,567 A | 6/1973 | Atkins |
| 3,764,861 A | 10/1973 | Orris |
| 4,796,013 A | 1/1989 | Yasuda et al. |

(Continued)

FOREIGN PATENT DOCUMENTS

| | | |
|---|---|---|
| EP | 2028078 A1 | 2/2009 |
| EP | 1645166 B1 | 7/2009 |

(Continued)

OTHER PUBLICATIONS

Potentially Related U.S. Appl. No. 14/275,999, filed May 12, 2014.

(Continued)

*Primary Examiner* — Shawntina Fuqua (74) *Attorney, Agent, or Firm* — The Dobrusin Law Firm, P.C.; Daniel P. Aleksynas (57) ABSTRACT

A system comprising: a heater located within a steering wheel and a heater located within a vehicle seat; wherein the steering wheel is a first plate and the vehicle seat is a second plate and a shift in a signal is monitored from the first plate, the second plate, or both so that a presence and absence of an occupant is detected, and wherein the heater in the steering wheel and the heater in the vehicle seat are a sensor.

20 Claims, 6 Drawing Sheets

(56) References Cited

U.S. PATENT DOCUMENTS

| | | |
|---|---|---|
| 5,006,421 A | 4/1991 | Yang et al. |
| 5,446,391 A | 8/1995 | Aoki et al. |
| 5,482,314 A | 1/1996 | Corrado et al. |
| 5,722,686 A | 3/1998 | Blackburn et al. |
| 5,824,996 A | 10/1998 | Kochman et al. |
| 5,844,486 A | 12/1998 | Kithil et al. |
| 5,890,085 A | 3/1999 | Corrado et al. |
| 5,935,474 A | 8/1999 | Grischenkov et al. |
| 6,057,530 A | 5/2000 | Gurevich |
| 6,093,908 A | 7/2000 | Haag |
| 6,094,610 A | 7/2000 | Steffens et al. |
| 6,135,494 A | 10/2000 | Lotito et al. |
| 6,150,642 A | 11/2000 | Weiss et al. |
| 6,158,768 A | 12/2000 | Steffens et al. |
| 6,172,344 B1 | 1/2001 | Gordon et al. |
| 6,179,378 B1 | 1/2001 | Baumgartner et al. |
| 6,218,947 B1 | 4/2001 | Sutherland |
| 6,220,627 B1 | 4/2001 | Stanley |
| 6,270,114 B2 | 8/2001 | Mai et al. |
| 6,270,117 B1 | 8/2001 | Storey |
| 6,272,411 B1 | 8/2001 | Corrado |
| 6,275,146 B1 | 8/2001 | Kithil et al. |
| 6,292,727 B1 | 9/2001 | Norton |
| 6,294,758 B1 | 9/2001 | Masao et al. |
| 6,378,900 B1 | 4/2002 | Stanley et al. |
| 6,392,542 B1 | 5/2002 | Stanley |
| 6,499,359 B1 | 12/2002 | Washeleski et al. |
| 6,512,202 B2 | 1/2003 | Haag et al. |
| 6,517,106 B1 | 2/2003 | Stanley et al. |
| 6,520,535 B1 | 2/2003 | Stanley et al. |
| 6,538,405 B1 | 3/2003 | Brzozowski et al. |
| 6,552,550 B2 | 4/2003 | Karray et al. |
| 6,577,023 B1 | 6/2003 | Stanley et al. |
| 6,577,142 B2 | 6/2003 | Eisenmann et al. |
| 6,584,387 B1 | 6/2003 | Norton |
| 6,682,095 B2 | 1/2004 | Roychoudhury et al. |
| 6,693,440 B2 | 2/2004 | Basir et al. |
| 6,693,442 B2 | 2/2004 | Karray et al. |
| 6,696,948 B2 | 2/2004 | Thompson et al. |
| 6,703,845 B2 | 3/2004 | Stanley et al. |
| 6,782,759 B2 | 8/2004 | Shank et al. |
| 6,812,431 B2 | 11/2004 | Morinet et al. |
| 6,814,889 B1 | 11/2004 | O'Grady et al. |
| 6,816,077 B1 | 11/2004 | Shieh et al. |
| 6,825,765 B2 | 11/2004 | Stanley et al. |
| 6,831,565 B2 | 12/2004 | Wanami et al. |
| 6,906,293 B2 | 6/2005 | Schmiz et al. |
| 6,927,678 B2 | 8/2005 | Fultz et al. |
| 6,968,263 B1 | 11/2005 | Norton |
| 6,968,746 B2 | 11/2005 | Shank et al. |
| 6,974,935 B2 | 12/2005 | O'Grady |
| 7,053,344 B1 | 5/2006 | Surjan et al. |
| 7,065,438 B2 | 6/2006 | Thompson et al. |
| 7,083,227 B2 | 8/2006 | Brennan et al. |
| 7,084,763 B2 | 8/2006 | Shieh et al. |
| 7,088,113 B2 | 8/2006 | Basir et al. |
| 7,098,674 B2 | 8/2006 | Stanley et al. |
| 7,102,527 B2 | 9/2006 | Shieh et al. |
| 7,106,206 B2 | 9/2006 | Sprecher et al. |
| 7,132,642 B2 | 11/2006 | Shank et al. |
| 7,134,715 B1 | 11/2006 | Fristedt et al. |
| 7,135,983 B2 | 11/2006 | Filippov et al. |
| 7,151,452 B2 | 12/2006 | Shieh |
| 7,180,306 B2 | 2/2007 | Stanley et al. |
| 7,190,277 B2 | 3/2007 | Fultz et al. |
| 7,191,044 B2 | 3/2007 | Thompson et al. |
| 7,217,891 B2 | 5/2007 | Fischer et al. |
| 7,285,748 B2 | 10/2007 | Nelson et al. |
| 7,293,467 B2 | 11/2007 | Shank et al. |
| 7,306,283 B2 | 12/2007 | Howick et al. |
| 7,321,311 B2 | 1/2008 | Rieth et al. |
| 7,362,225 B2 | 4/2008 | Rittmueller et al. |
| 7,436,299 B2 | 10/2008 | Shieh et al. |
| 7,436,315 B2 | 10/2008 | Kamizono et al. |
| 7,500,536 B2 | 3/2009 | Bulgajewski et al. |
| 7,513,166 B2 | 4/2009 | Shank et al. |
| 7,521,940 B2 | 4/2009 | Koch et al. |
| 7,542,836 B1 | 6/2009 | Norton |
| 7,614,314 B2 | 11/2009 | Park et al. |
| 7,656,169 B2 | 2/2010 | Scheckenbach et al. |
| 7,663,076 B2 | 2/2010 | Tarry |
| 7,663,378 B2 | 2/2010 | Ito et al. |
| 7,679,378 B2 | 3/2010 | Hawes et al. |
| 7,688,204 B2 | 3/2010 | Yamanaka et al. |
| 7,735,932 B2 | 6/2010 | Lazanja et al. |
| 7,741,582 B2 | 6/2010 | Howick et al. |
| 7,830,246 B2 | 11/2010 | Hawkins |
| 7,838,804 B2 | 11/2010 | Krobok |
| 7,859,423 B2 | 12/2010 | Yamanaka et al. |
| 7,876,106 B2 | 1/2011 | Hansen et al. |
| 7,880,480 B2 | 2/2011 | Hansen |
| 7,880,481 B2 | 2/2011 | Zangl et al. |
| 7,908,927 B2 | 3/2011 | Washeleski et al. |
| 7,928,341 B2 | 4/2011 | Ito et al. |
| 7,962,311 B2 | 6/2011 | Launay et al. |
| 7,987,033 B2 | 7/2011 | Launay et al. |
| 8,011,234 B2 | 9/2011 | Kandler |
| 8,033,182 B2 | 10/2011 | Launay et al. |
| 8,041,482 B2 | 10/2011 | Federspiel et al. |
| 8,049,520 B2 | 11/2011 | Schleech |
| 8,091,960 B2 | 1/2012 | Kincaid et al. |
| 8,118,362 B2 | 2/2012 | Nishimura et al. |
| 8,120,483 B2 | 2/2012 | Ootaka et al. |
| 8,138,772 B2 | 3/2012 | McDonnell et al. |
| 8,143,907 B2 | 3/2012 | Yamanaka et al. |
| 8,154,394 B2 | 4/2012 | Hansen |
| 8,184,013 B2 | 5/2012 | Hammerschmidt |
| 8,193,820 B2 | 6/2012 | Nakagawa et al. |
| 8,198,569 B2 | 6/2012 | Krobok et al. |
| 8,223,016 B2 | 7/2012 | Nakagawa et al. |
| 8,237,455 B2 | 8/2012 | Griffin |
| 8,269,512 B2 | 9/2012 | Ootaka |
| 8,285,454 B2 | 10/2012 | Norton |
| 8,294,478 B2 | 10/2012 | Yamanaka et al. |
| 8,305,092 B2 | 11/2012 | Tabaczynski |
| 8,335,617 B2 | 12/2012 | Satake et al. |
| 8,354,936 B2 | 1/2013 | Ootaka |
| 8,378,819 B2 | 2/2013 | Ootaka |
| 8,400,323 B2 | 3/2013 | Fischer et al. |
| 8,405,408 B2 | 3/2013 | Ootaka |
| 8,448,521 B2 | 5/2013 | Washeleski et al. |
| 8,456,180 B2 | 6/2013 | Sotarski |
| 8,493,079 B2 | 7/2013 | Petereit et al. |
| 8,500,194 B2 | 8/2013 | Fischer et al. |
| 8,507,831 B2 | 8/2013 | Howick et al. |
| 8,564,424 B2 | 10/2013 | Evarts et al. |
| 8,581,603 B2 | 11/2013 | Hwang et al. |
| 8,599,004 B2 | 12/2013 | Nakagawa |
| 8,659,303 B2 | 2/2014 | Hayakawa |
| 8,669,492 B2 | 3/2014 | Ito et al. |
| 8,698,511 B2 | 4/2014 | Wendt et al. |
| 8,700,265 B2 | 4/2014 | Stanley et al. |
| 8,704,651 B2 | 4/2014 | Nix et al. |
| 8,729,430 B2 | 5/2014 | Lamesch et al. |
| 8,754,661 B2 | 6/2014 | Satake et al. |
| 8,766,142 B2 | 7/2014 | Howick et al. |
| 8,818,637 B2 | 8/2014 | Stanley et al. |
| 8,882,142 B2 | 11/2014 | Lamesch et al. |
| 8,957,689 B2 | 2/2015 | Virnich et al. |
| 8,970,231 B2 | 3/2015 | Kandler |
| 8,970,232 B2 | 3/2015 | Kandler |
| 8,994,385 B2 | 3/2015 | Virnich et al. |
| 9,000,331 B2 | 4/2015 | Virnich et al. |
| 9,006,618 B2 | 4/2015 | Lamesch et al. |
| 2001/0001522 A1 | 5/2001 | Mai et al. |
| 2004/0144197 A1 | 7/2004 | O'Grady |
| 2005/0077287 A1 | 4/2005 | O'Grady |
| 2009/0255916 A1 | 10/2009 | Katterman et al. |
| 2010/0038351 A1 | 2/2010 | Tabaczynski |
| 2010/0277186 A1 | 11/2010 | Bieck et al. |
| 2011/0006788 A1 | 1/2011 | Kim et al. |
| 2011/0148648 A1 | 6/2011 | Fischer et al. |
| 2011/0163764 A1 | 7/2011 | Shank et al. |
| 2011/0163765 A1 | 7/2011 | Gray et al. |

(56) References Cited

U.S. PATENT DOCUMENTS

| | | |
|---|---|---|
| 2011/0163767 A1 | 7/2011 | Chen et al. |
| 2011/0163878 A1 | 7/2011 | Gray et al. |
| 2011/0260435 A1 | 10/2011 | Hsu et al. |
| 2011/0285408 A1 | 11/2011 | Satake et al. |
| 2011/0290775 A1 | 12/2011 | Cubon et al. |
| 2011/0307148 A1 | 12/2011 | Griffen et al. |
| 2012/0001463 A1 | 1/2012 | Breed et al. |
| 2012/0161953 A1 | 6/2012 | Nakagawa |
| 2013/0020305 A1 | 1/2013 | Lamesch et al. |
| 2013/0069673 A1 | 3/2013 | Virnich et al. |
| 2013/0092677 A1* | 4/2013 | Virnich ............... B60N 2/5685 219/204 |
| 2013/0098890 A1 | 4/2013 | Virnichi et al. |
| 2013/0113239 A1 | 5/2013 | Akaike et al. |
| 2013/0127211 A1 | 5/2013 | Aoki |
| 2013/0127212 A1 | 5/2013 | Aoki |
| 2013/0134745 A1 | 5/2013 | Aoki |
| 2013/0147238 A1 | 6/2013 | Thinnes |
| 2013/0186884 A1 | 7/2013 | Barfuss et al. |
| 2013/0213950 A1 | 8/2013 | Bulgajewski et al. |
| 2013/0263672 A1 | 10/2013 | Washeleski et al. |
| 2013/0270874 A1 | 10/2013 | Lamesch |
| 2013/0277351 A1 | 10/2013 | Lamesch |
| 2013/0328577 A1 | 12/2013 | Satake et al. |
| 2013/0334196 A1 | 12/2013 | Lamesch |
| 2014/0043047 A1 | 2/2014 | Fischer et al. |
| 2014/0097651 A1 | 4/2014 | Fortune et al. |
| 2014/0125355 A1 | 5/2014 | Grant |
| 2014/0131344 A1 | 5/2014 | Lamesch |
| 2014/0132042 A1 | 5/2014 | Midderhoff et al. |
| 2014/0151356 A1 | 6/2014 | Maguire et al. |
| 2014/0197942 A1 | 7/2014 | Tabaczynski et al. |
| 2014/0239980 A1 | 8/2014 | Ootaka |
| 2014/0253151 A1 | 9/2014 | Kandler et al. |
| 2014/0285223 A1 | 9/2014 | Inoue |
| 2014/0299591 A1 | 10/2014 | Howick et al. |
| 2014/0326709 A1 | 11/2014 | Chabach et al. |
| 2014/0339211 A1 | 11/2014 | Barfuss et al. |
| 2015/0048845 A1 | 2/2015 | Petereit et al. |
| 2015/0054317 A1 | 2/2015 | Fortune et al. |

FOREIGN PATENT DOCUMENTS

| | | |
|---|---|---|
| EP | 1127356 B1 | 8/2011 |
| EP | 2572929 A1 | 3/2013 |
| WO | 2005/036930 A1 | 4/2005 |
| WO | 2005/093158 A1 | 10/2005 |
| WO | 2010/065411 A1 | 6/2010 |
| WO | 2011/079092 A1 | 6/2011 |
| WO | 2012/038325 A1 | 3/2012 |
| WO | 2012/038326 A1 | 3/2012 |
| WO | 2012/113833 A1 | 8/2012 |
| WO | 2013/050621 A1 | 4/2013 |

OTHER PUBLICATIONS

International Search Report and Written Opinion, Application No. PCT/IB2014/061411, dated Sep. 19, 2014.
Potentially related U.S. Appl. No. 14/333,975, filed Jul. 17, 2014.

* cited by examiner

OCCUPANCY SENSING WITH HEATING DEVICES

FIELD

The present teachings generally relate to devices that provide both heating capabilities and sensing capabilities so that an occupant is sensed and heated simultaneously without the need for separate heaters and sensors.

BACKGROUND

The present teachings are predicated upon providing an improved heater and more preferably an improved heater including sensing capabilities for use in a vehicle. Generally, heaters include a wire that is formed in a pattern. The wire produces heat when electricity is applied to the wire. The wire may also be placed in a carbonaceous material so that as the wire heats up, the heat is diffused into the carbonaceous material heating a larger area. Heaters may include electrodes that are connected by a positive temperature coefficient material so that electricity is conducted from one electrode through the positive temperature coefficient material to the other electrode and heat is produced. Other heaters have a woven configuration where a plurality of long materials are woven together to form a heater. Yet another heater may include positive temperature coefficient material that provides heat as power extends through the positive temperature coefficient material. Each of these heaters are useful in providing heat and each heating type provides certain advantages and may have certain drawbacks.

In addition to heaters, sensors may be installed within a vehicle component. These sensors may be an occupant sensor that determines the presence of an occupant within a vehicle seat, the weight of the occupant, the size of the occupant, or a combination thereof so that an air bag may be turned on or off based upon sensed characteristics. Typically, when a heater and an occupant sensor are used, two discrete components are installed within a component so that one produces heat and the other senses. Having two discrete devices adds to the complexity of the system, increases installation expenses, increases the number of components that may fail, increases packing space, may cause electrical interference between the two devices, or a combination thereof. Therefore, it is desirable to have a combination heater that includes sensing capabilities and heating capabilities so that the heater both heats and senses the presence of an occupant the position of an occupant, or both without the need for additional devices.

Examples of heaters may be found in U.S. Pat. Nos. 5,824,996; 5,935,474; 6,057,530; 6,150,642; 6,172,344; 6,294,758; 7,053,344; 7,285,748; and 7,838,804; all of which are incorporated by reference herein for all purposes. Examples of combination sensors and heaters may be found in U.S. Pat. Nos. 5,006,421; 6,270,117; 6,392,542; 7,500,536; 7,928,341; 8,400,323; and U.S. Patent Application Publication Nos. 2001/0001522; 2009/0255916; 2010/0277186; 2011/0290775; 2011/0006788; 2011/0148648; 2011/0307148; 2012/0001463; 2012/0161953; 2013/0020305; 2013/0098890; 2013/0113239; 2013/0127211; European Patent. No. EP2572929 and International Application No. WO2010/0065411; WO2011/079092; WO2012/038325; WO20121038326; WO2012/113833; and WO2013/050621 all of which are incorporated by reference herein in their entirety for all purposes.

It would be attractive to have a combination heater and sensor that are free of discrete components. It would be attractive to have a heater that acts as a sensor without the addition of any additional sensing elements. What is needed is a flexible heater that provides good heating performance and also can be used as a sensor so that the heater/sensor may be installed in compact spaces, in spaces that require a high degree of flexibility, or both. It would be attractive to have a combination heater and sensor that heats an occupant and senses if the occupant of a particular space is in contact with the combination heater/sensor.

SUMMARY

The present teachings meet one or more (if not all) of the present needs by providing an improved device that includes: a system comprising: a heater located within a steering wheel and a heater located within a vehicle seat; wherein the heater in the steering wheel is a first capacitor plate and the heater in the vehicle seat is a second capacitor plate and a change in capacitance between the first plate and the second plate is monitored so that a presence and absence of an occupant is detected.

The present teachings provide: a system comprising: a heater located within a steering wheel and a heater located within a vehicle seat; wherein the heater in the steering wheel is a first plate and the heater in the vehicle seat is a second plate and a shift in a signal is monitored between the first plate, the second plate, or both so that a presence and absence of an occupant is detected, and wherein the heater in the steering wheel and the heater in the vehicle seat are a sensor.

The teachings herein provide: a method comprising: a) installing a combination heater and sensor into two discrete components of an automobile that are located adjacent to each other; (b) providing energy to the combination heater and sensor so that a heating layer of the combination heater and sensor produces heat; (c) providing a signal to the combination heater and sensor so that a sensing layer of the combination heater and sensor produces a signal for determining a presence of an occupant, contact between the occupant and the component of the automobile, or both; and (d) monitoring the signal for an occupant, lack of an occupant, lack of contact between the component and the occupant, or a combination thereof.

The present teachings provide: a method comprising: (a) installing a heater into two discrete components of an automobile that are located adjacent to each other; (b) providing energy to the heater so that the heater produces heat; (c) providing a signal to the heater so that a signal passes through the heater to determine presence of an occupant, contact between the occupant and one or both of the two discrete components of the automobile, or both; and (d) monitoring the signal for an occupant, lack of an occupant, lack of contact between one of the two discrete components and the occupant, or a combination thereof.

The teachings herein surprisingly solve one or more of these problems by providing a combination heater and sensor that are free of discrete components. The teachings herein provide a heater that acts as a sensor without the addition of any additional sensing elements. The teachings herein provide a flexible heater that provides good heating performance and also can be used as a sensor so that the heater/sensor may be installed in compact spaces, in spaces that require a high degree of flexibility, or both. The teachings herein provide a combination heater and sensor that heats an occupant and senses if the occupant of a particular space is in contact with the combination heater/sensor.

DETAILED DESCRIPTION

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

A system may include two or more heaters that are configured to provide sensing capabilities as well as heating capabilities simultaneously. The system may function to heat and sense. The system may include two spatially separated heaters that work in conjunction with each other to provide both heating and sensing functions regarding the respective spaced apart locations. The system may include at least two heaters that are located in areas of a vehicle that are in virtually constant contact with an occupant so that the heaters may be used to sense the relationship of an occupant relative to one or both of the heaters and sensors. For example, the heaters may be located in a steering wheel and a seat and the sensors may be used to determine if the occupant is in contact with the seat the steering wheel, or both while the automobile is in operation. Preferably, the system includes at least one heater that is connected to an active sensing system. More preferably, both heaters may be connected to an active sensing system. Most preferably, both heaters may be part of an active sensing system. If both heaters are connected to an active sensing system one heater may be an active heater (e.g., a signal applied through the heater) and the other heater may be a passive heater (e.g., a change in a monitored signal (e.g., a signal is monitored and measurements are taken) between the two heaters may be monitored only in the active heater).

The sensing system may function to sense an occupant, a position of an occupant, contact locations of an occupant, hand positions of an occupant (i.e., one hand, two hands, no hands, passenger hands, right hand, left hand, or a combination thereof), or a combination thereof. The sensing system may function to provide a sensing signal and monitor the sensing signal to determine a relationship of an occupant relative to one or more sensed components. The sensing signal may be a monitored voltage, a measured voltage, a calculated capacitance, or a combination thereof. The sensing system may continuously apply a signal, intermittently apply a signal, or both. The sensing system may continuously monitor, intermittently monitor, or both a signal, a device, a condition, or a combination thereof. The sensing system may part of a control system that controls the heater, may be a discrete system from the control system, or both. The sensing system may provide a signal through the heater and convert and/or use the heater to a sensor. Preferably, the sensing system and the control system work together so that when the control system is shut off the sensing system is substantially simultaneously turned on so that a sensing signal is applied through the heater. The sensing system may be only on when the heater is off. The sensing system may be continuously on when the system is in cooling mode, ventilation mode, or both. The sensing system may be continuously on when the heater is off. The sensing system may intermittently be turned on between heating phases. The sensing system may be part of a controller that controls all of the functions of the heater, the sensor, or both. The sensing system may be connected to one or more heaters, and even two or more heaters. For example, the steering wheel may have two or more heater portions that are spaced apart and the system may send signals to each of the two or more of the heaters, converting the heaters to sensor, to determine what portion of the steering wheel the occupant is contacting (or which hand is on the wheel). When more than one heater portion is present in the steering wheel the sensing system may simultaneously sense all of the heater portions, may sense the heater portions in series, or a combination of both. The sensing system may determine occupant presence, occupant position, or both by monitoring the occupant's position in the seat. The sensing system may simultaneously determine one or more, two or more, or even three or more occupant positions. The sensing system may detect presence of an occupant, size/weight of an occupant (i.e., over or under 25 Kg for example), which hand is on a steering wheel, or a combination thereof. The sensing system may monitor the size of the occupant in the driver's seat and if the occupant is below a predetermined size/weight the sensing system will alert the safety system, may not allow the system to start, or both. The sensing system may monitor for an occupant when the vehicle is turned on, when the vehicle is off, or both. For example, when an occupant gets in the car the sensing system may determine if the occupant meets or exceeds a predetermined weight so that if the person meets or exceeds the predetermined weight the safety system may allow the car to be started and if the person is below the predetermined weight and/or size the car may not start or additional steps may be required. The sensing system, control system, or both may be the same system such that the sensing system and the control system control the temperature of the heater, sense a desired condition of an occupant, provide feedback to controller, or a combination thereof.

The control system may function to control the operation of the heater. The control system may control temperature, operation, duration of operation, maximum temperature, rate of temperature increase, or a combination thereof of the heater. The control system may be part of a controller that controls the operation of the heater, the sensor, the seat, other functions of the automobile, or a combination thereof. The control system may turn a heater on, turn a heater off, turn a sensor on, turn a sensor off, perform measurements, monitor the heater when sensing signals area applied, monitor the heater when the heater is converted to a sensor, regulate temperature of a heater, or a combination thereof. The sensing system, the control system, or both may be connected to a safety system, an onboard guidance system, or both so that if an irregular condition is sensed the safety system, on board guidance system, or both may function to protect the occupant, the vehicle, or both as is discussed herein.

The safety system, on board guidance system, or both (hereinafter safety system) may be any system that temporarily controls an automobile when a driver is unresponsive, distracted, out of control, hands are off the steering wheel, or a combination thereof. The safety system may stop a vehicle, steer the vehicle, control a vehicle, or a combination thereof. The safety system may control a vehicle when the vehicle is moving erratically so that the vehicle is maintained on a roadway, is moved off a roadway to safety, is stopped, or a combination thereof. The safety system may control a vehicle when the control system, the sensing system, a controller, or a combination thereof provide a signal that a predetermined condition (e.g., the driver's hands have been off a steering wheel for a predetermined amount of time) has been sensed and the safety system is required to act. The safety system may prevent starting of the vehicle when an occupant below a predetermined size/weight is detected in the driver's seat, attempting to start the vehicle, or both. The safety system may be used with any sensing system, control system, heater, or a combination thereof taught herein.

The device as taught herein may be useful as a heater and/or incorporated into another device so that the other device may be used as a heater. The device as taught herein may be used for any known heating application. Preferably, the device as taught herein may be connected to, incorporated into, or both a vehicle seat, a steering wheel, a shifter, a floor board, headrest, door panel, arm rest, occupant contact area, or a combination thereof. More preferably, the heating device includes both a seat heater and a steering wheel heater that may be used individually or separately as a sensor. Preferably, both the seat heater and the steering wheel heater may be used as both a heater and a sensor without the addition of any components that are not required to form a heater. The heater as discussed herein may be a discrete piece that is laid over a cushion of a vehicle seat (i.e., bun portion, back portion, or both) and then a trim cover placed over the heater, around a steering wheel and then covered by a trim piece, or both. The heater may be a wire heater, a carbon heater, a positive temperature coefficient heater, a printed heater, a heater as discussed herein and expressly incorporated by reference herein, or a combination thereof. A portion of the heater may enter a trench in the cushion so that the heater, the cushion, the trim cover, or a combination thereof are attached to a seat frame.

The heater for each component may be a single piece heater. The heater for one or more of the components may be constructed of multiple discrete parts. The heater may have two or more, three or more, four or more, or even five or more discrete parts. For example, a steering wheel heater may be formed of two discrete heaters that each wrap about 180 degrees around the steering wheel. In another example, the seat may include a seat heater that has two discrete parts where one part is located in the back and one is located on the bun. Each discrete heater may be a completed heater that may operate individually of the other discrete heaters or the discrete heaters may be partially and/or fully assembled and work together with the other discrete heaters to form a completed heater (e.g., the heaters may be connected together with jumper wires extending between the discrete heaters). When more than one part is present, each of the discrete parts may be comprised of only a heating portion and the heating portion may be used as a sensor. The two or more discrete heaters may be a left heater and a right heater so that one side of the steering wheel is heated and/or sensed. The heaters may wrap around about 90 degrees of a steering wheel so that quadrants are formed for sensing and heating. When more than one heater piece is present each heater piece may independently operate (i.e., provide sensing, heating, or both). A trim cover may have attachment features that extend through the heater so that the heater is connected to the trim cover and the vehicle component.

The heater may be secured in the vehicle seat and/or steering wheel by a mechanical fastener, an adhesive, pressure from one or more adjacent layers, welding, heat staking, ultrasonic welding, sewing, or a combination thereof. For example, a thread of the same material as the heater may sew the heater to a trim layer, a support, or both so that the heater is secured within the component. The adhesive may be releasably connected to the heater, permanently connected to the heater, a pressure sensitive adhesive, glue, a hook and loop fastener, a spray on adhesive, a peel and stick adhesive, or a combination thereof. The heater may be secured directly to the trim layer, directly to the cushion (i.e., bun, back, or both) of the seat, directly to the steering wheel, or a combination thereof. A mechanical fastener may extend through, connect to, attach on, or a combination thereof the heater so that the heater may be fixed within the seat, within the steering wheel, or both. The mechanical fastener may be a metal bar that extends over a portion of the heater and pulls the heater and the trim layer into close proximity to the cushion; a plastic tag that punches through a portion of the heater, a portion of the trim layer, or both; a hog ring; or a combination thereof. The heater of the teachings herein may be used in conjunction with other devices.

The heater, the steering wheel, the vehicle seat, or a combination thereof may be free of a separate sensor. For example, the heater itself may be used as a sensor as is discussed herein. The passenger sensor may be a capacitive sensor, a pressure sensor, a membrane sensor, infrared, passive and/or active ultrasonic sensor, a mass sensor, or a combination thereof. Preferably, the sensor is a capacitive sensor. The sensor may be connected to a system that: triggers an alarm when the user is not in contact with the steering wheel, turns on an onboard guidance system when the user is not contacting the steering wheel, provides an alarm when a passenger is detected and the passenger is not wearing a seat belt, turns off the air bag when an occupant below a predetermined weight is in the seat, turns on a guidance system when an occupant other than the occupant in the driver's seat is contacting the steering wheel, or a combination thereof. The heater and a passenger sensor may be used with an active cooling system, active heating system, a ventilated system, or a combination thereof.

The heater may be porous so that air may pass directly through the heater. The heater may include one or more porous layers that cover the heater and/or one or more through holes so that air passes directly through the heater and the one or more layers that cover the heater (e.g., a fleece layer, an adhesive, a protective covering layer, or a combination thereof). The heater may include one or more barrier layers that fully and/or partially cover the heater so that the barrier layers assist in directing fluid flow to regions of the heater that may be contacted. The barrier layer when present may be formed in any configuration so that air may be directed to specific desired locations. For example, the heater may be substantially porous through a central "U" shaped portion of the heater and the regions surrounding the "U" shape may include a non-porous or barrier material that may prevent a fluid from passing so that the fluid being moved is directed to the contact areas. The barrier layer may be any barrier layer that is free of interference when the heater is used as a sensor, free of impeding a step of detecting a change in capacitance, or both. The heater may include one or more through holes so that air may be moved through the heater. The heater may include and/or be in fluid communication with a fan and/or blower, be adjacent to a blower and/or fan so that the blower and/or fan may move a fluid through and/or around the heater. The heater, the fan, the blower, or a combination thereof may include a peltier device, a thermoelectric device, or both so that hot and/or cooled air (i.e., conditioned air) may be moved towards an occupant. The heater may be indirectly and/or directly connected to a fan, blower, or both that include a peltier device, a thermoelectric device, or both.

The heater may be connected to an insert (e.g., a bag, diffuser, manifold) that assists in distributing conditioned air to an occupant. The heater may have one or more holes that mirror the holes in the insert. The heater may have no holes and the air from the bag may pass directly through the heater in route to an occupant. The heater layer may be connected directly to the insert. All or a portion of the heater layer may be connected to the insert. The insert may be one or more polymeric layers that form a substantially air impermeable layer and/or an air impermeable layer so that air directed into the insert is directed to a predetermined region. The insert may include one or more spacer materials. The heater as taught herein may act as the spacer material and/or part of a spacer layer that forms an open space in the insert. Additional aspects of the insert and its various layers and materials can be gleaned from the teachings herein including those of Column 1, line 45 through Column 3, line 67: Column 4; line 54 though Column 6, line 32 and FIGS. 2-3 of U.S. Pat. No. 7,083,227, and Column 3; line 34 through Column 10; line 2; Column 11, line 4 through Column 13, line 18; and FIGS. 14, 15A and 15B of U.S. Pat. No. 7,735,932 incorporated by reference herein, which shows various alternative embodiments of inserts, insert materials, and insert constructions that may be used with the heater taught herein.

The heater may be a wire heater, a carbotex heater, a positive temperature coefficient heater, a conductive fabric heater, a printed heater, a woven heater, an interwoven heater, a needle punched heater, or a combination thereof. The heater may include electrodes. The heater may be free of any additional electrically conducting layers (e.g., busses, electrodes, terminals, traces, spurs, braches, or a combination thereof). Preferably, the heater includes busses, electrodes, or both that extend substantially along a length and/or width (e.g., the electrodes may circumscribe an inner and/or outer portion of the heater) of the heater and assist in applying power to the heater. More preferably, the heating layer is free of terminals that connect the power source to the heater (i.e., a single point of power application). The heating layer may include and/or be connected to a plurality of terminals that connect power application wires to the heater/sensor. The heating layer may be free of and/or include gold, silver, copper, or a combination thereof. The heater may include positive temperature coefficient material (PTC). The heating layer may be free of any additional electrically conducting layers, positive temperature coefficient layers, additives, or a combination thereof that are added to the heating layer in a separate step, that assist in producing heat, producing a signal, or both. The heating layer may be free of a stabilizing material, a soft filling substance, an impregnated filling material or a combination thereof. For example, the heating layer is free of a stabilizing material, a soft filing substance, an impregnated filling material, or a combination thereof that is added to the heater to assist in conducting power between the fibers. More preferably, the heating layer may be the only portion of the heater required to produce heat. For example, the heating layer may not be a substrate, the heating layer may be free of one or more materials disposed and/or printed on to form the heating layer, a material interwoven into the material, or a combination thereof. The configuration of the heating layer may be used to vary a resistivity, surface power density, or both of the heating layer.

The heating layer may be attached to one or more terminals and upon application of electricity (e.g., power) the heating layer produces heat. The heating layer when connected to a positive power source and a negative power source (i.e., power application layers) may produce heat. Preferably, the heating layer is free of terminals that connect to busses and/or electrodes. For example, the busses and/or electrodes may be connected to the heating layer and the busses and/or electrodes may be connected to the power source. The terminal may directly and/or indirectly attach to the heating layer using any device so that electricity enters the heating layer through the terminals and the heating layer produces heat. The terminals may be crimped onto the heating layer. For example, the power applications may include terminals that connect a power source, power application wires, or both to the power applications. The terminals may be connected by sewing, bonding, a mechanical fastener, or a combination thereof to the heating layer, each power application layer, or both. Preferably, the heating layer may free of terminals directly attached to the heating layer (i.e., a single point of power application). The heater may be free of mechanical fasters that attach a power source to the heater. For example, the heating layer may not have a mechanical attachment device that grips the heating layer and secures one or more wires to the heater. The heating layer may include two or more power applications that assist in supplying power to the heating layer.

The two or more power applications may be located at any location on the heater. Preferably, the two or more power applications are spaced apart. The two or more power applications may be spaced a sufficient distance apart so that the heater is partially and/or entirely energized upon an application of power. More preferably, the two or more power applications are located in an edge region of the heater. For example, one power application may be located along one edge of the heater and a second power application may be located along the opposing edge so that power travels though the heater as the power travels from the first edge to the second edge. However, the power applications may be a continuous geometric shape with no end or beginning and the power applications may extend continuously around an outer, an inner, or both of the heater to supply power to the heater. The heater may include 2 or more, 3 or more, or even 4 or more power applications. For example, the heater may be two discrete parts and each of the two discrete parts may include two power applications. In another example, the heater may be two discrete parts and each of the two discrete parts may be connected to two power applications and one of the power applications may be shared between the two heaters. In yet another example, a single heater may be used and power application portions of the same polarity may be located at each end and a power application portion of a different polarity may be located between the power application portions at the ends. Each of the power applications may be used for sensing. Thus, each discrete heater may include at least one power application that is unique for that heater and sensing may be performed by monitoring a signal, measuring a signal, or both from that power application. Each power application may include one or more parts for applying power. In one preferred example, each of the power applications consist of two discrete buss bars, electrodes, wires, or a combination thereof that are connected together and each of the two buss bars, electrodes, wires, or a combination thereof assist in supplying power to the heating layer. The buss bars, electrodes, wires, or a combination thereof may be made of the same material, different material or a combination thereof.

The adhesive layer may function to connect the heater to an article of manufacture (e.g., seat, steering wheel). The adhesive layer may be any adhesive sheet that forms a connection upon an application of heat. The adhesive layer may be any adhesive layer discussed herein. The adhesive layer may a polyamide. The adhesive layer preferably is a non-woven material. The adhesive layer preferably is a plurality of fibers and/or fiber-like adhesive particles interconnected with voids and/or pores between the interconnected fibers and/or fiber-like adhesive particles. The adhesive layer may have a plurality of voids, a plurality of pores, or both. The adhesive layer may have a sufficient amount of voids and/or pores so that when the adhesive is connecting two or more electrically conducting layers (e.g., one or more layers of the power application, the heating layer, or both) power may pass through the voids and/or pores, an electrical connection may be maintained, the adhesive layer does not interfere with the supply of power between two or more electrically conducting layers, or a combination thereof, and a connection may be formed between the two or more layers. An example of an adhesive fabric that may be used is sold under the trade name Spunfab available from Spunfab Ltd.

The heater may be comprised of only a heating layer (e.g., the heater may include one layer). Preferably, the heater includes at least three layers. However, the heater may be free of any layers that are secured over the heating layer. For example, the heater may include a layer that interpenetrates the heating layer and forms a partially and or fully protecting layer over the heating layer. The heating layer may incorporate partially and/or entirely a discrete material (i.e., a protecting layer) into the heating layer so that the heating layer is protected by the protecting layer. The protecting layer may be any layer that protects the heater so that the heater produces heat without blocking and/or inhibiting the sensing characteristics of the heater. The protecting layer may be a reinforcing layer. For example, the protecting layer may reinforce the individual fibers so that the fibers are strengthened and the strength characteristics of the heater are increased (e.g., tensile strength, tearing strength, fold strength, the like, or a combination thereof). The protecting layer may be any material that becomes interwoven into the heating layer so that the protecting layer increases the strength of the heating layer (e.g., tensile strength, tearing strength, fold strength, the like, or a combination thereof), the insulation properties of the heating layer, or both. Preferably, the protecting layer increases the strength of the heating layer and forms a partially dielectric coating over the heater or a fully dielectric coating over the heater. The protecting, layer may form an insulating layer over the forward surface, the rearward surface, the side edges, or a combination thereof of the heating layer so that the heating layer on the outside has dielectric characteristics, fluid resistance characteristics, or both. The protecting layer may form a layer on a forward side, a rearward side, a side edge, a top edge, a bottom edge, or a combination thereof so that the protecting layer is a dielectric layer over the heating layer. The heater may be free of an attachment layer.

The heater a discussed herein may be controlled using any method discussed herein. Preferably, the heater include a thermistor or a negative coefficient temperature sensor that monitors and/or measures the temperature of the heater and based upon the measured temperature a controller controls the temperature of the heater, the ventilation system, the conditioning system, or both. The heater, the conditioning system, the ventilation system, or both may be controlled using pulse width modulation.

The heater, the system, the sensor, the sensing system, the control system, or a combination thereof may include one or more switches that turn the heater, the sensor, the control system, the sensing system, or a combination thereof on and off. Preferably, the system includes switches that disconnect power, grounding, or both when the sensing system is activated. The one or more switches may be any switch that switches a heater between a heating mode and a sensing mode. The one or more switches may be any switch that connects and/or disconnects a heater from a power source, a battery, a ground, a signal source, a sensor, or a combination thereof. Preferably, a switch is located between both the battery and a heater, and a ground and a heater so that the heater is electrically isolated during application of a signal. The switches may electrically isolate one or both of the heaters. More preferably, the heater is a seat heater and one switch is located between a battery and the seat heater and one switch is located between a ground and the seat heater. One or more switches may be located between a steering wheel heater and a battery, a ground, or both. Preferably, the heater in the steering wheel may be always connected to the battery, a ground, or both. The switches may isolate one or both of the heaters so that a change in the system due to an impedance change may be measured. The impedance of the system, when an occupant is sitting on the seat, may be greater when one or both of the switches are open than when both of the switches are closed. For example, the impedance of the system may be greater when the switches are open than when the switches are closed. The heater, the sensor, or both may be a more sensitive sensor when the switches are open (i.e., a circuit is not complete) during a sensing phase than when the switches are closed (i.e., a circuit is completed by the switch) during a sensing phase.

The heater may include a sensor. Preferably, the heater may be a sensor. More preferably, the heater is a combination heater and sensor. Most preferably, the heater is free of a discrete sensor. Each of the heaters may be a capacitor plate, may be a portion of a capacitor, or both. The heater and an occupant may be combined to form a capacitor plate. Preferably, the heaters each act as a capacitor plate. The sensing portion of the heater may be used simultaneously with heating, during a heating cycle, after a heating cycle, between heating cycles, or a combination thereof. Preferably, a heating cycle and a sensing cycle may alternate. The sensor may detect the presence of an occupant, contact from an occupant with a component, mass of an occupant, any other sensing function discussed herein, or a combination thereof. The sensing portion of the heater may include only the heater (i.e., a power application portion, one or more power connections, a continuous heating layer). The sensing portion may function when a signal is passed into the heater through the one or more buss bars.

The signal may be any signal that detects an occupant, contact from an occupant, the presence of an occupant, or a combination thereof. The signal may be an analog signal, a digital signal, or a combination of both. Preferably, the signal is a digital signal. The signal may be a shift in a signal (e.g., frequency, capacitance, voltage, or a combination thereof) hereinafter referred to as the shift. The signal has a frequency and the frequency of the signal may be a predetermined frequency. The signal may be zeroed, calibrated, or both for each heater when the heater is in a steady state (e.g., not in contact with an occupant), before installation, before the heater is turned on, or a combination thereof. The signal may be compared to the zeroed signal, the calibrated signal or both to determine the shift. The shift of the signal may be constant as the signal passes through the heater during steady state (i.e., no shift). The frequency of the signal may shift when an occupant contacts a component that includes the heater, an occupant is in close proximity to the component and/or heater, or both. The shift may be a frequency shift (e.g., millihertz, microseconds, the like, or a combination thereof), a voltage shift, a capacitance shift, or a combination thereof that is sufficiently large to be caused by an occupant. For example, placing a bag on a seat may not cause a sufficient shift (if any) to trigger the sensor to send a signal when compared to the shift by an occupant. The shift may be measured, calculated, or both. The shift may be any shift associated with a change in capacitance of the system of about 50 pF or more, about 75 pF or more, or about 100 pF or more. The shift may be any shift associated with a change in voltage and/or capacitance of the system of about 500 pF or less, about 400 pF or less, about 300 pF or less, or about 200 pF or less. Preferably, the shift is associated with a change in voltage and/or capacitance of between about 100 pF and about 200 pF. For example, a signal with a value (e.g., frequency) may enter the heater and the signal may be monitored and/or measured as the signal exits the heater, when an occupant is in contact with the heater, the value of the signal may shift so that the value of the signal as it exits is delayed when compared to a signal when the occupant is not in contact with the heater. The shift may be caused by a change in impedance and/or resistance of the system, a change in voltage of the system caused by a change in resistance and/or impedance, or both. The change in impedance may be created by an occupant, an amount of surface area an occupant has in contact with the sensor/heater, or both. The shift may be determined may monitoring voltage of the system and then the monitored and/or measured voltage of the system may be converted to a capacitance and compared to a look up table to determine occupant contact. The monitored signal (e.g., voltage) may be converted to a capacitance so that the presence of an occupant, a passenger, contact, or a combination thereof may be detected.

The shift may be increased by grounding one of the combination heaters/sensors through the occupant. Preferably, the combination heater/sensor in the vehicle seat is grounded only through an occupant. For example, a switch may be located between a ground and the heater and the switch is open during application of a signal to the system. The combination heater/sensor may be grounded through a chassis of a vehicle. For example, the heater may not be grounded to the earth, but the heater may be grounded to the chassis of the vehicle. The switch when closed during application of a signal may induce a capacitance of (C) and opening of the switch during application of the signal may induce a capacitance of about 2 C or more, of about 3 C or more, preferably of about 4 C or more, or more preferably about 5 C or more. The capacitance (C) may be about 10 pF or more, about 20 pF or more, about 30 pF or more, or even about 40 pF or more. Thus, for example if the capacitance is 20 pF when the switch is closed then the capacitance when the switch is open is 3 C the capacitance is 60 pF. The signal may be continuously monitored, intermittently monitored, or both.

The step of monitoring may compare a signal, a frequency of a signal, a capacitance of a signal, a shift, or a combination thereof (hereinafter monitored signal (a monitored signal may include a measured signal)) to a lookup table to determine the presence of an occupant, contact of an occupant or both. The monitored signal may be filtered through a resistor before the monitored signal reaches the signal controller. The monitored signal may be a voltage. The one or more resistors may function to provide a constant current and/or constant voltage to the sensor so (i.e., removes noise, spikes, or both). The resistor may function to assist the system in determining the presence of an occupant, contact of the occupant, or both. The monitored signal may be compared to a look-up table to determine the status of the occupant. The monitored signal may determine if an occupant is present, if an occupant is in contact with a component, or both. The monitored signal may be constant when an occupant is in contact with a component including the heater, and a change in the monitored signal is outside of a predetermined monitored signal (e.g., an occupant is not in contact with the heater for a predetermined amount of time) may result in a predetermined response. A predetermined response may occur after a monitored signal is outside of a predetermined value (e.g., a monitored signal) for about 1 second or more, about 2 seconds or more, about 3 seconds or more, or about 5 seconds or more. The predetermined response may occur after a monitored signal outside of a predetermined value is present for about 30 seconds or less, preferably about 20 seconds or less, more preferably about 10 seconds or less. The heating function may include one controller to provide power to the heater so that the heater produces heat and the sensing function may a separate controller to provide sensing, or the heating function and the sensing function may be operated by the same controller.

Power, current, voltage, or a combination thereof may be constantly applied, intermittently applied, varied, or a combination thereof so that the heater produces heat. Preferably, the controller may regulate control of the heater, the temperature of the heater, or both using pulse width modulation (PWM). Depending on the desired temperature of the heater the PWM signal providing energy may be lengthened or shortened. Thus, energy is either being applied or not applied (i.e., on or off) and the duration of applying energy is adjusted. For example, when the heater is on medium the PWM may provide a signal between about 60 percent and about 80 percent, thus, the heater is off between about 40 percent and 20 percent of the time. The power, current, voltage, or a combination thereof may be turned on and off. The power, current, voltage or a combination thereof may be turned on and off after a predetermined amount of time, at a designated time interval, or both. The power, current, voltage, or a combination thereof of may be turned off about every 10 milliseconds or more, about every 20 milliseconds or more, about every 50 milliseconds or more. The power, current, voltage, or a combination thereof may be turned off about every 10 seconds or less, about every 5 seconds or less, or about every 2 seconds or less (i.e., every 1.8 seconds (0.5 Hz)). The power, current, voltage or a combination thereof may be turned off so that signals may be passed through the heater/sensor. The power, current, voltage, or a combination thereof may be intermittently turned on and off so that a signal may be applied. The power, current, voltage, or a combination thereof may be turned on and off at predetermined times during an initial startup and/or initial ramp up of the heater (e.g., the first five minutes) and then after the initial ramp up pulse width modulation may be used to regulate the temperature of the heater. The power, current, voltage, or a combination thereof may be turned on and off for the entire duration of heating. The sensor may provide sensing functions when the heater is off and/or energy is not being applied to heat the heater.

A signal may be provided to the heater at any time so that the heater may be used for sensing. Preferably, a signal is applied to the heater when energy is not being applied (i.e., the heater is "off"). During application of the sensing signal one or more transistors (e.g., MOSFET) may disconnect the heater from the power source, disconnect the heater from a ground, or both. During application of the sensing signal, the power controller, heating capabilities, or both may be disconnected. During heating the signals may be turned off and then immediately upon turning off of the heater the signals may be turned on and applied. The signal may be applied when the heater/sensor is isolated from the battery, the ground, or both. One or both of the heater/sensors may be isolated from the battery, the ground, or both when a signal is applied through one or both of the heater/sensors. The signal may be a signal applied and received directly from the heater/sensor. The signal may not be an electromagnetic field. For example, the sensor may not detect by monitoring a field around and/or created by the heater/sensor and the sensor may directly monitoring the voltage, capacitance, a signal, or a combination thereof that passes through the heater/sensor. The signal may be any signal with a frequency. The signal may be any signal where the signal shifts upon a change in resistance and/or impedance.

The teachings herein provide a method of heating and sensing. The method includes one or more of the steps discussed herein in virtually any order. Energy may be applied to the heater so that the heater produces heat. A signal may be applied to the heater so that the heater is a sensor. Energy, a signal, or both may be applied alternatingly or simultaneously. The energy may be intermittently turned off so that a sensing signal may be applied. A controller may monitor the shift in voltage and/or capacitance of the system, a shift in the frequency of a monitored signal, or both. Capacitance may be calculated and/or looked up based upon a monitored signal (e.g., voltage). One or more transistors may turn on and/or off the heating portion of a circuit (e.g., a ground, a power source, or both). The sensing system may sense a presence of an occupant between the steering wheel and the vehicle seat, the size of the occupant, contact with a steering wheel, which hand is on the steering wheel, or a combination thereof. The sensing system may use a multiplexer to determine one or more sensed conditions, two or more sensed conditions, or even three or more sensed conditions based upon a monitored signal. For example, upon sending and receiving a signal the system may first determine the presence of an occupant, then the system may determine the size of the occupant, and finally the system may determine which hand is in contact with the steering wheel (if less than 2 hands are in contact with the steering wheel). The system may calibrate the heater and/or system in order to determine a shift from the calibration point. The system may be zeroed. The system may be zeroed, calibrated, or both only at an initial startup. The system may be zeroed, calibrated, or both before every startup.

Figure 1:
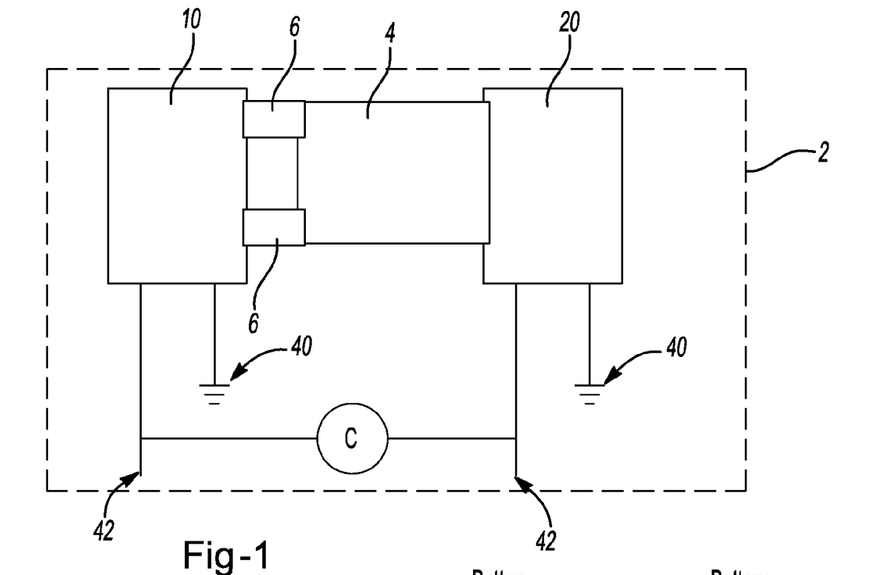
FIG. 1 illustrates active occupancy sensing of a combined heating and sensing system.

FIG. 1 illustrates a heating and sensing system 2 having a sensor/heater in a seat 20 and a sensor/heater in a steering wheel 10. As illustrated, an occupant 4 is sitting on the seat 20 and the occupant's hands 6 are in contact with the steering wheel 10. The steering wheel heater/sensor 10 and the seat heater/sensor 20 are connected to a power source 42 so that both the steering wheel heater/sensor 10 and the seat heater/sensor 20 generate heat. Both the steering wheel heater/sensor 10 and the seat heater/sensor 20 are connected to a ground 40. During heating one of the steering wheel heater/sensor 10 or the seat heater/sensor 20 is temporarily turned off so that the capacitance between the steering wheel 10 and the seat 10 is monitored to determine if an occupant is in contact with the steering wheel 10.

Figure 2A:
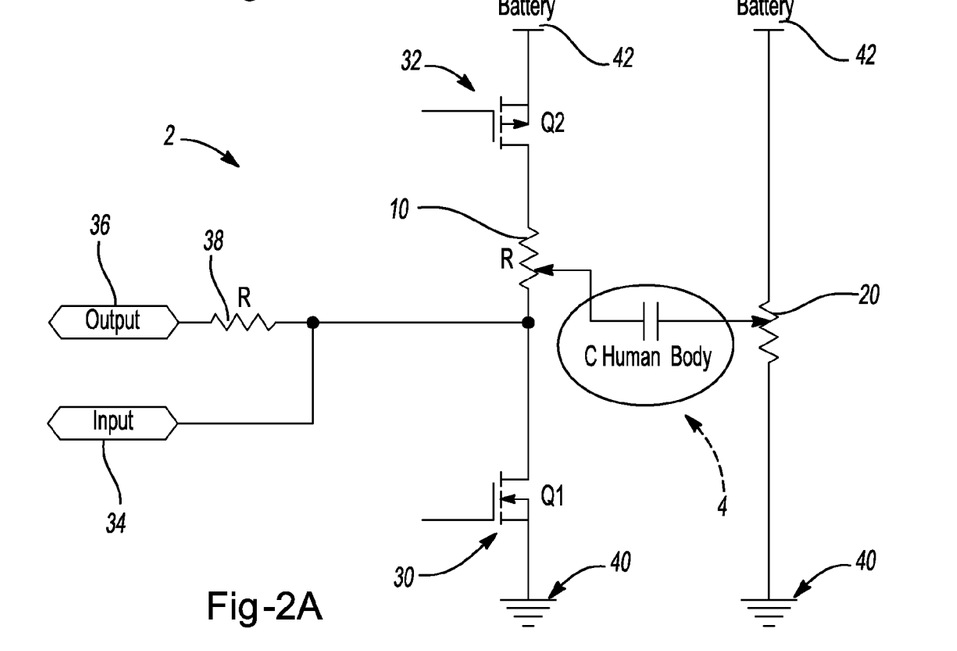
FIG. 2A illustrates one possible circuit diagram of the teachings herein.

FIG. 2A illustrates a circuit diagram of another example of a heating and sensing system 2. The heating and sensing system 2 includes a heating/sensing steering wheel 10 and a heating/sensing seat 20 with an occupant 4 located therebetween electrically connecting the steering wheel 10 and the seat 20 so that an adjusted capacitance is formed therebetween. Power 42 from a battery is provided to both the steering wheel 10 and the seat 20 so that they are powered and provide heat and/or sensing capabilities. Both the steering wheel 10 and the seat 20 are grounded 40 so that sensing capabilities through the occupant 4 is increased when compared to non-grounded sensors. As illustrated, the steering wheel heater/sensor 10 is used for sensing and is located between a switch 30 and another switch 32. During a step of sensing the switches 30 and 32 are open so that power does not flow through the steering wheel sensor/heater 10 so that a signal is sent from the input 34 through the steering wheel sensor/heater 10 back through a resistor 38 and then through an output 36 where the change (i.e., delta) in capacitance and/or voltage from the occupant is monitored.

Figure 2B:
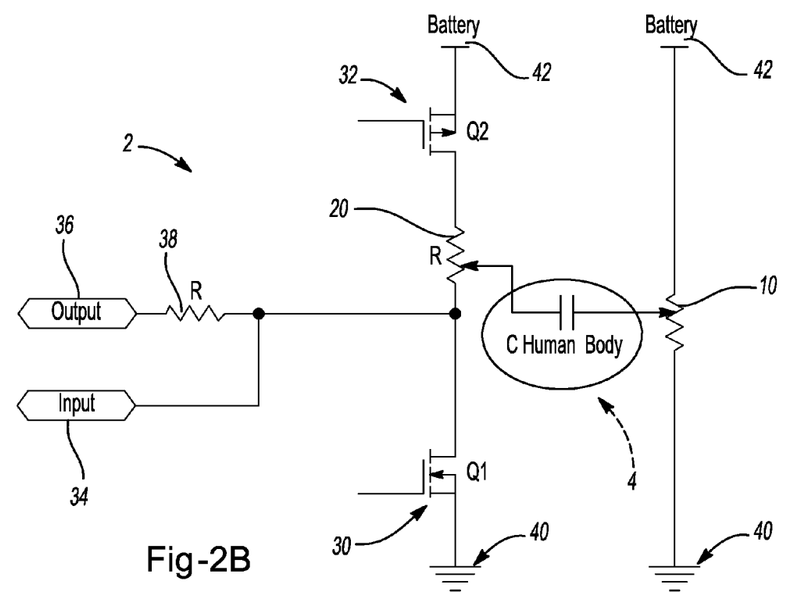
FIG. 2B illustrates an alternative circuit diagram of the teachings herein.

FIG. 2B illustrates a circuit diagram of another example of a heating and sensing system 2. The heating and sensing system 2 includes a heating/sensing steering wheel 10 and a heating/sensing seat 20 with an occupant 4 located therebetween electrically connecting the steering wheel 10 and the seat 20 so that an adjusted capacitance is formed therebetween. Power 42 from a battery is provided to both the steering wheel 10 and the seat 20 so that they are powered and provide heat and/or sensing capabilities. Both the steering wheel 10 and the seat 20 are grounded 40 so that sensing capabilities through the occupant 4 is increased when compared to non-grounded sensors. As illustrated, the seat heater/sensor 20 is used for sensing and is located between a switch 30 and another switch 32. During a step of sensing the switches 30 and 32 are open so that power does not flow through the seat sensor/heater 20 so that a signal is sent from the input 34 through the seat sensor/heater 20 back through a resistor 38 and then through an output 36 where the change (i.e., delta) in capacitance and/or voltage from the occupant is monitored.

Figure 3:
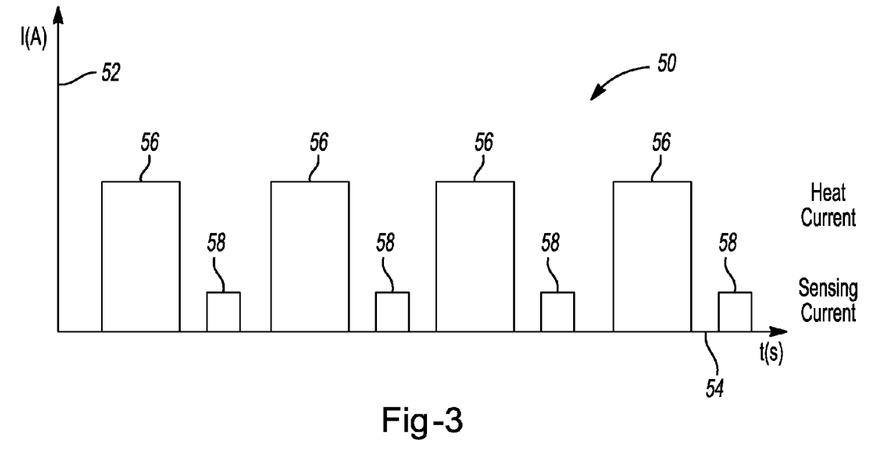
FIG. 3 illustrates an example of a graphic depiction of a duty cycle for heating and sensing.

FIG. 3 illustrates one example of graph 50 demonstrating the application of current 52 over time 54. As illustrated, heat current 56 is applied and then sensing current 58 in an alternating relationship. The heating current 56 and sensing current 58 are applied so that they are not applied simultaneously. The duration of the heating current 56 and sensing current 58 may be varies depending on a requested temperature by an occupant. However, as illustrated the heating current 56 and the sensing current 58 are not constant, thus, there is an off phase as is illustrated.

Figure 4A:
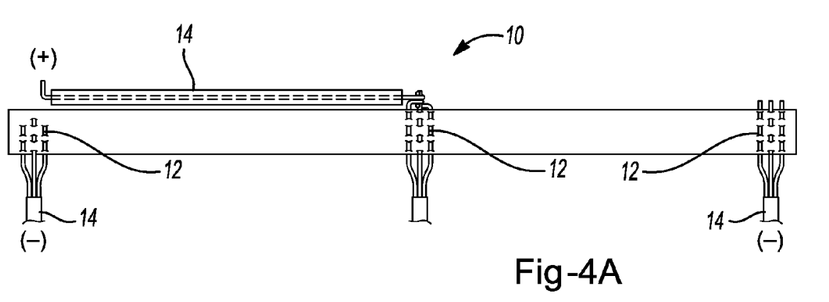
FIG. 4A illustrates an example of a heater/sensor including one central power application portion with a power application portion on each side.

FIG. 4A illustrates a steering wheel heater/sensor 10 with three power application portions 12. As illustrated, the middle power application portion 12 is a positive power application portion with a negative power application portion 12 on each side. The middle power application portion 12 may be located at virtually any location between the two end power application portions 12 although substantially centered is preferred. A positive power application wire 14 extends into contact with the center power application portion 12 while each of the end power application portions 12 are connected to a separate negative power application wire 14.

Figure 4B:
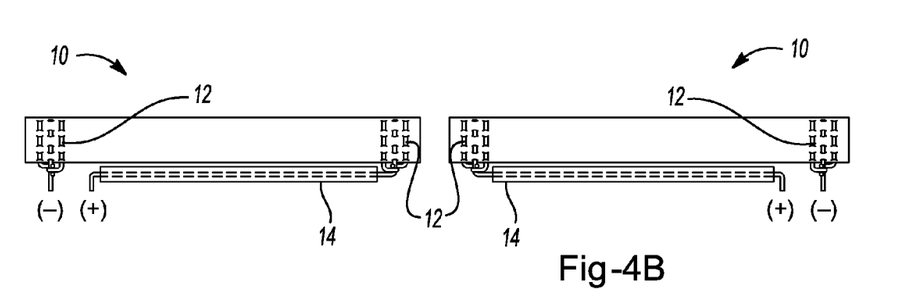
FIG. 4B illustrates a heater/sensor with multiple portions each including discrete portion application portions.

FIG. 4B illustrates two discrete steering wheel heater/sensors 10 that when combined form a steering wheel heater/sensor. Each of the discrete steering wheel heater/sensors 10 includes a positive power application portion 12 and a negative power application portion 12 that are each connected to a discrete power application wire 14. As illustrated, the positive power application portions 12 are located proximate to each other and the negative power application portions 12 are located on the outside of the steering wheel heater/sensors 10. As illustrated, the steering wheel heater/sensor 10 when in sensing mode can sensor if one or more hands of an occupant are in contact with a steering wheel, as each steering wheel heater/sensor 10 will be able to individually sense an occupants hand (not shown).

Figure 4C:
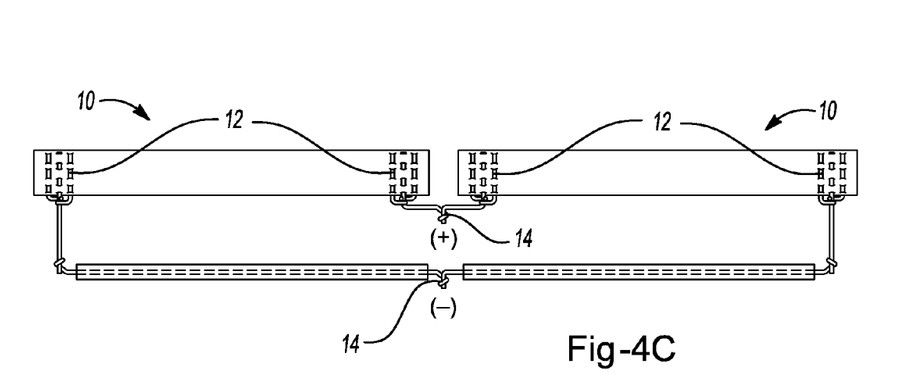
FIG. 4C illustrates a heater/sensor with multiple portions having power application portions electrically connected.

FIG. 4C illustrates two discrete steering wheel heater/sensor 10 that are electrically connected together via common positive power application wires 14 and negative power application wires 14. As illustrated, the negative power application wires 14 connect to outside ends of the steering wheel heater sensors 10 and the positive power application and located proximate to each other in ends of the steering wheel heater/sensor 10 opposite the negative power application portions 12. As illustrated, each steering wheel heater/sensor 10 can determine contact with an occupant individually so that the sensor can determine if one or occupant body parts are in contact with the steering wheel heater/sensor 10 during a sensing phase.

Figure 5A:
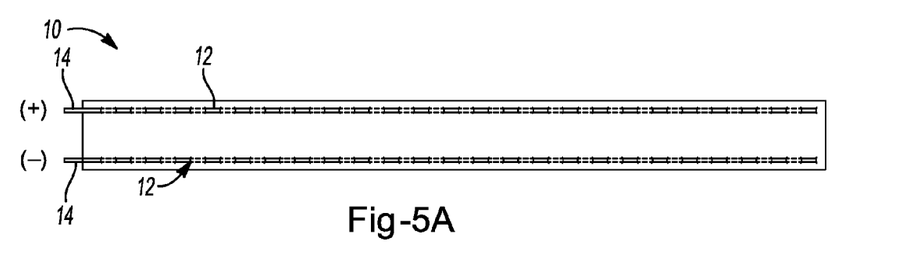
FIG. 5A illustrates a heater/sensor including longitudinal power application portions.

FIG. 5A illustrates a steering wheel heater/sensor 10 with longitudinal power application portions 12 that extend the length of the steering wheel heater/sensor 10. The longitudinal power application portions 12 extend substantially parallel along opposite edges of the steering wheel heater/sensor 10 with heater/sensor material extending therebetween and electrically connecting the two opposing power application portions 12.

Figure 5B:
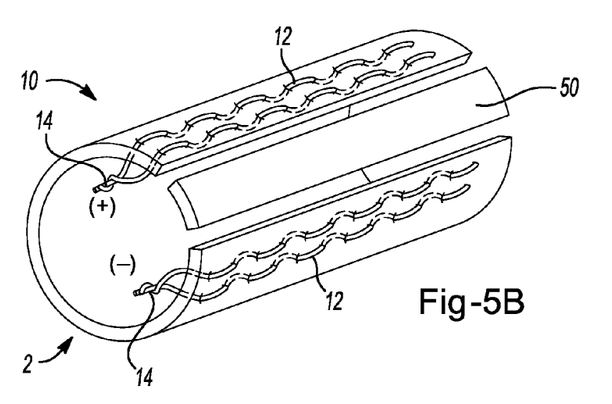
FIG. 5B illustrates the heater/sensor of FIG. 5A disposed about a steering wheel.

FIG. 5B illustrates the steering wheel heater/sensors 10 of FIG. 5A extending around a steering wheel 2. The steering wheel heater/sensor 10 includes power application portions 12 that are wrapped around a core 4 (not shown) so that the power application portions 12 are located substantially proximate to each other with power application wires 14 extending from each of the power application portions 12. As illustrated, an insulating layer 60 is located between the two power application portions 12 and electrically isolates the power application portions 12 from each other except through the material of the steering wheel heater/sensor 10 so that power travels from one power application portion 12 through the material, generating heat, to the second power application portion 12.

Figure 6:
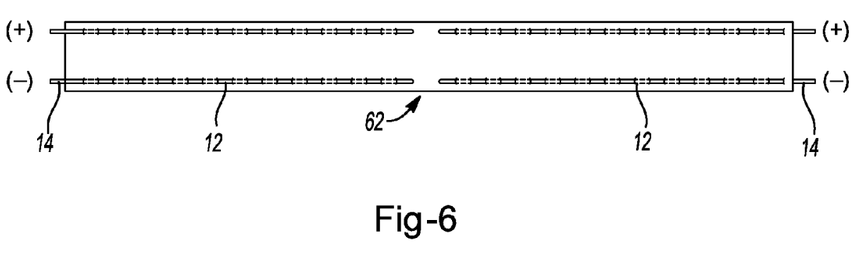
FIG. 6 illustrates heater/sensor including multiple discrete power application portions extending along the length of the heater/sensor for providing power.

FIG. 6 illustrates a steering wheel heater/sensor 10 having power application wires 14 connecting to each end of the steering wheel heater/sensor 10 so that a longitudinal power application portion 12 extends along the length of the steering wheel heater/sensor 10. The power application portions 12 extend longitudinally from each end and terminate before the power application portions 12 come into contact so that a small gap 62 is located between each end of the power application portions 12, and each of the positive power application portions 12 are electrically isolated and each of the negative power application portions 12 are electrically isolated. The negative power application portions 12 and the positive power application portions 12 are electrically connected though the steering wheel heater/sensor 10.

Figure 7A:
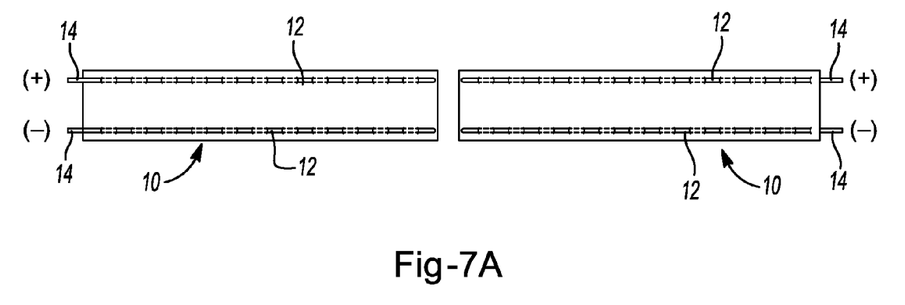
FIG. 7A illustrates two discrete heater/sensors each including longitudinal power application portions.

FIG. 7A illustrates two discrete steering wheel heaters/sensors 10 that each include a positive and negative power application portion 12 that are each connected to a power application wire 14. Each steering wheel heater/sensor 10 heats individually and senses individually by passing power and/or signals from one power application portion 12 through the heater material and to the opposing power application portion 12. Each steering wheel heater/sensor 10 can individually sense a condition so that more than one conditions such as two hands can be sensed simultaneously.

Figure 7B:
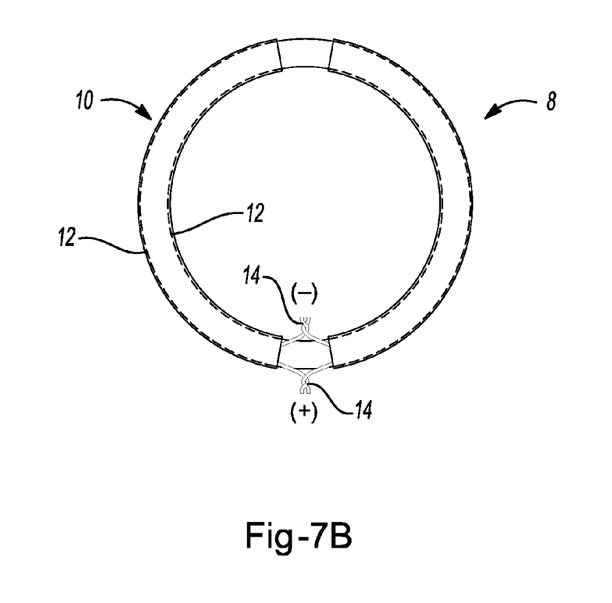
FIG. 7B illustrates the two discrete heater/sensors of FIG. 8A disposed on a steering wheel.

FIG. 7B illustrates the two discrete heater/sensors 10, 20 of FIG. 7A wrapped around a steering wheel 8 and the power application wires 14 connected together so that power and/or signals are distributed between the steering wheel heater/sensor 10.

Figure 8A:
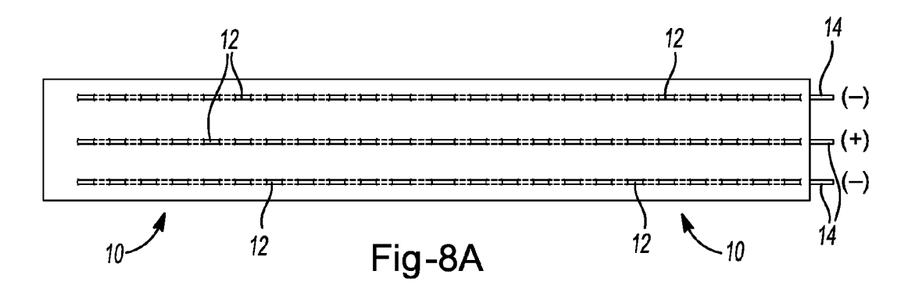
FIG. 8A illustrates a heater/sensor including multiple discrete power application portions extending along the length of the heater/sensor for providing power.

FIG. 8A illustrates a steering wheel heater/sensor 10 that includes three longitudinal power application portions 12. The two outside power application portions 12 as illustrated are negative and the middle power application portion 12 is positive. Each of the power application portions are connected to a power application wire 14 so that power and sensing signals are applied through the heater/sensor 10, 20.

Figure 8B:
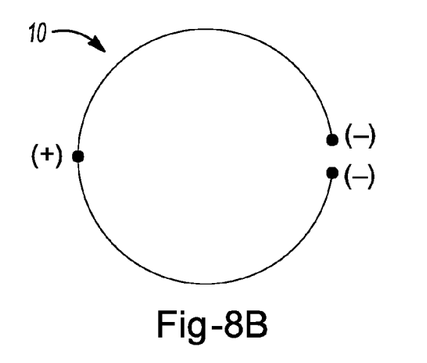
FIG. 8B illustrates an example of an electrical configuration for the heater/sensor.

FIG. 8B illustrates a cross-sectional view of the steering wheel heater/sensor 10 when the steering wheel heater/sensor 10 is wrapped around a steering wheel 8. As illustrated, the two negative ends of the steering wheel heater/sensor 10 are placed in close proximity and even in contact without the steering wheel heater/sensor 10 shorting.

Figure 8C:
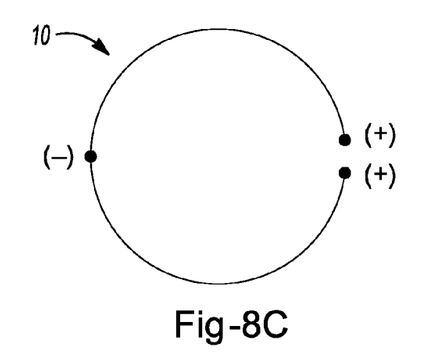
FIG. 8C illustrates another example of an electrical configuration.

FIG. 8C illustrates a cross-sectional view of another steering wheel heater/sensor 10 when the steering wheel heater/sensor 10 is wrapped around a steering wheel 8. As illustrated, the two positive ends of the steering wheel heater/sensor 10 are placed in close proximity and even in contact without the steering wheel heater/sensor 10 shorting.

Figure 8D:
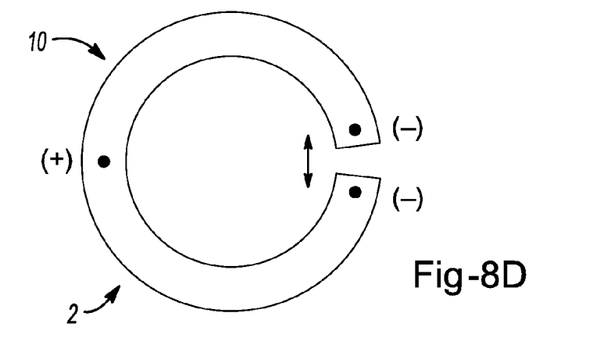
FIG. 8D illustrates an example of a heater/sensor with ends of the heater/sensor located proximate without a gap between the ends.

FIG. 9D illustrates the steering wheel heater/sensor 10 being wrapped around a steering wheel 8 and the ends moved into contact so that a gap is does not exist between the ends of the steering wheel heater/sensor 10.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A system comprising:
    a heater located within a steering wheel and
    a heater located within a vehicle seat;
    wherein the heater in the steering wheel is a first plate and the heater in the vehicle seat is a second plate and a shift in a signal is monitored between the first plate, the second plate, or both so that a presence and absence of an occupant is detected, and
    wherein the heater in the steering wheel and the heater in the vehicle seat are a sensor.

2. The system of claim 1, wherein the heater in the seat is grounded and the heater in the steering wheel is grounded when current is applied to the heater in the seat and the heater in the steering wheel.

3. The system of claim 1, wherein a switch is located between a power source and the steering wheel heater.

4. The system of claim 1, wherein a switch is located between a ground and the steering wheel heater.

5. The system of claim 2, wherein a switch is located between a power source and the steering wheel heater, and a switch is located between a ground and the steering wheel heater.

6. The system of claim 1, wherein the steering wheel heater is connected to a sensing system that detects a change in capacitance between the steering wheel heater and the vehicle seat heater.

7. The system of claim 1, wherein the steering wheel is connected to a sensing system that detects a change in voltage due to a presence of an occupant, contact of an occupant with the steering wheel, contact of an occupant with the vehicle seat, or both.

8. The system of claim 1, wherein a switch between a battery and the seat heater and a switch between a ground and the seat heater are off when a sensing current is applied to the system.

9. The system of claim 5, wherein a switch between a battery and the seat heater and a switch between a ground and the seat heater are off when a sensing current is applied to the system.

10. The system of claim 1, wherein the steering wheel heater is two discrete heater pieces and each piece individually receives the signal, energy, or both.

11. A method comprising:
    a) installing a heater into each of two discrete components of an automobile that are located adjacent to each other;
    b) providing energy to the heaters so that the heaters produces heat;
    c) providing a signal to the heaters so that a signal passes through the heaters to determine presence of an occupant, contact between the occupant and one or both of the two discrete components of the automobile, or both; and
    d) monitoring the signal for an occupant, lack of an occupant, lack of contact between one of the two discrete components and the occupant, or a combination thereof.

12. The method of claim 11, wherein the method includes a step of monitoring a shift in the signal between the combination heaters and sensors in the two discrete components.

13. The method of claim 11, wherein one of the two discrete components is a steering wheel.

14. The method of claim 11, wherein one of the two discrete components is a seat.

15. The method of claim 12, wherein one of the two discrete components is a steering wheel and one of the two discrete components is a seat.

16. The method of claim 11, wherein the energy provided to the combination heater and sensor is provided by a pulse width modulated technique.

17. The method of claim 11, wherein a switch is located between a power source and the heater in the steering wheel and the switch is closed when energy is provided to the heater and the switch is open when a sensing signal is applied to one or both of the heaters in the two discrete components.

18. The method of claim 11, wherein a switch is located between a ground and the heater in the steering wheel and the switch is closed when energy is provided to the heater and the switch is open when a sensing signal is applied to one or both of the heaters in the two discrete components.

19. The method of claim 14, wherein the method includes a step of closing the switch during application of energy and opening the switch during application of a signal.

20. The method of claim 15, wherein the method includes a step of closing the switch during application of energy and opening the switch during application of a signal.

\* \* \* \* \*